(12) United States Patent
Ramachandra Rao et al.

(10) Patent No.: US 8,380,188 B2
(45) Date of Patent: Feb. 19, 2013

(54) SYSTEM AND METHOD FOR TEMPORARILY ACCESSING ANOTHER USER'S SERVICE

(75) Inventors: Padmaja Ramachandra Rao, Bangalore (IN); Rama Moorthy Kuvethanda, Bangalor (IN); Diego Kaplan, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 378 days.

(21) Appl. No.: 12/248,182

(22) Filed: Oct. 9, 2008

(65) Prior Publication Data

US 2010/0093342 A1    Apr. 15, 2010

(51) Int. Cl.
*H04W 4/00* (2009.01)

(52) U.S. Cl. ...... 455/432.1; 455/406; 455/409; 455/411; 455/414.1; 455/420

(58) Field of Classification Search .......... None
See application file for complete search history.

(56) References Cited

U.S. PATENT DOCUMENTS

| | | | |
|---|---|---|---|
| 6,115,613 A | 9/2000 | Jonsson | |
| 6,564,047 B1 * | 5/2003 | Steele et al. | 455/405 |
| 6,788,771 B2 * | 9/2004 | Manto | 379/114.05 |
| 2002/0081992 A1 * | 6/2002 | Keller et al. | 455/410 |
| 2005/0197098 A1 * | 9/2005 | Trossen | 455/406 |
| 2007/0099609 A1 * | 5/2007 | Cai | 455/428 |
| 2008/0070570 A1 * | 3/2008 | Jiang | 455/433 |
| 2008/0102790 A1 * | 5/2008 | Schultz | 455/410 |
| 2008/0176586 A1 * | 7/2008 | George et al. | 455/466 |

* cited by examiner

*Primary Examiner* — Rafael Pérez-Gutiérrez
*Assistant Examiner* — Suhail Khan (57) ABSTRACT

A wireless handset, system and method is described that enables a wireless handset having access to an international long distance service to provide another wireless handset with temporary or limited international long distance service. The wireless handset comprises a transceiver, a user interface, a service request, and a first service acknowledgement. The transceiver communicates with a wireless network managed by a wireless network service provider that controls the first service. The wireless network communicates with the wireless handset and a separate wireless handset that does not have access to the first service. The user interface enables the separate wireless handset to have temporary access to the first service. The service request communicated from the wireless handset requests the separate wireless handset have temporary access to the first service. The first service acknowledgement acknowledges the separate wireless handset has temporary access to the first service.

14 Claims, 6 Drawing Sheets

SYSTEM AND METHOD FOR TEMPORARILY ACCESSING ANOTHER USER'S SERVICE

FIELD OF THE INVENTION

This invention relates to a system and method for temporarily accessing another user's service. More particularly, the invention relates to a device, system and method that have temporarily access to another wireless user's service.

BACKGROUND

A telephone card, calling card or phone card is a card used to pay for telephone services. Such cards can use a prepaid system or credit-based system. The exact system for payment and use of the card depends on the telecommunication company. Currently, the most common types of telephone cards involve pre-paid credit where the card is purchased with a specific balance and the cost of calls made is deducted from the balance. Pre-paid phone cards are disposable. When the balance is exhausted another card is bought. Additionally, cards can often be refilled. There are also "post-paid" calling cards where the card includes a PIN and allows one to charge calls to a land-line telephone account.

To use a calling card a user must first find a vendor that sells the appropriate calling card. Many times these vendors are on-line and finding local vendors may be challenging. Additionally, there a various types of calling cards that can be used for domestic calls and others for international calls. With respect to international calls, the user may also have to specify the country or group of countries that are associated with the calling card. When purchasing the calling card there is the minimum price for purchasing the card that may go unused. Thus, if the user needs to make a short international call or communicate an SMS message or short voice message, the user must pay the minimum price and possibly throw away the card.

The use of a calling card may be further complicated because the user may first have to dial the numbers printed on the calling card, then the PIN number, and finally the destination number. This process is time consuming, especially in light of the call duration.

There are various alternatives to calling cards in other jurisdictions. For example in India, there are public telephones to make domestic calls and telephones that support international calls referred to as International Subscriber Dialing (ISD) phones. Thus, to make an international call in India—rather than using a calling card—a person directly dials the destination number from an ISD phone.

However, there are limitations to ISD phone service in that there are a limited number of ISD phones. With respect to wireless handsets, ISD service is enabled by the service provider or carrier if the subscriber has requested ISD service. However, there may be instances when a user does not have ISD service but still has a need for limited or temporary ISD service. However, even if the user desires limited or temporary use of ISD service, they cannot access ISD service.

SUMMARY

A wireless handset, system and method is described that enables a wireless handset having access to a first service to provide temporary access to a service corresponding to a separate wireless handset. The wireless handset comprises a transceiver, a user interface, a service request, and a first service acknowledgement. The transceiver communicates with a wireless network managed by a wireless network service provider that controls the first service. The wireless network communicates with the wireless handset and a separate wireless handset that does not have access to the first service. The user interface enables the separate wireless handset to have temporary access to the first service. The user interface receives authentication information from the separate wireless handset that is communicated by the wireless handset to the wireless network service provider. The service request communicated from the wireless handset requests the separate wireless handset have temporary access to the first service. The first service acknowledgement received by the wireless handset acknowledges the separate wireless handset has temporary access to the first service.

A system and method for enabling a first wireless user to temporarily access a service accessible to a second wireless user is also described. The system comprises a wireless network service provider, a first wireless handset that cannot access the service, a second wireless handset having access to the service, a user interface, a service request, a first service acknowledgement and a means for billing. The wireless network service provider enables the first service using a wireless network. The first wireless handset corresponding to the first wireless user communicates with the wireless network. The first wireless handset cannot access the first service supported by the wireless network. The second wireless handset corresponding to the second wireless user enables the second user to access the first service supported by the wireless network. The user interface of the second wireless handset enables the second user to request the first wireless handset have temporary access to the first service. The user interface is configured to receive authentication information from the first wireless handset that is communicated by the second wireless handset to the wireless network service provider. The service request communicated from the second wireless handset requests the first wireless handset have temporary access to the first service. The first service acknowledgement communicated from the wireless network to the second wireless handset acknowledges the first wireless handset has temporary access to the first service. The second wireless user is billed for the temporary access granted to first wireless handset.

DRAWINGS

The present invention will be more fully understood by reference to the following drawings which are for illustrative, not limiting, purposes.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems, and devices described hereinafter may vary as to configuration and as to details. Additionally, the methods may vary as to details, order of the actions, or other variations without departing from the illustrative method disclosed herein.

The wireless devices, systems and methods described herein support services that may be billed as a pre-paid service, post-paid service, a subscription service, or any combination thereof. In general, the devices, systems and methods operate within a carrier network, in which the users are typically subscribers of the carrier network or an affiliated carrier network. For purposes of this patent, the carrier network is more generally described as a wireless network service provider that manages or controls the operations of a wireless network or wireless communication system. The wireless network service provider may also be referred to as a carrier, operator, Internet Service Provider (ISP), Wireless Internet Service Provider (WISP), service provider, or other such terms. The wireless network service provider manages or controls the "wireless network" or "wireless communication system," wherein the terms "wireless network" or "wireless communication system" are used interchangeably.

There a variety of services that can be supported by the wireless network service provider. In the illustrative embodiments, the "services" include, but are not limited to, long distance service, international long distance service, transferring minutes from one wireless handset to another, International Subscriber Dialing (ISD), or any combination thereof. The other illustrative "services" that may also be provided by a wireless network service provider include information services, equipment protection, family plans, games, voice mail, Internet, email, messaging, music, ringtones, wallpaper, web applications, WI-FI calling or other such services that carriers provide.

For the illustrative international long distance service embodiment, the wireless devices, systems and methods described herein may be used when a particular user is unable to obtain a calling card that provides international long distance service. For purposes of this patent the terms "international long distance" and "ISD" are used interchangeably.

The devices, systems and methods enable a user to obtain "minutes" without having to buy a calling card. Thus, another illustrative service enables a first subscriber to transfer minutes from to a second subscriber, thereby enabling the first subscriber to control the usage of minutes, give away remaining minutes, or sell remaining minutes.

Figure 1:
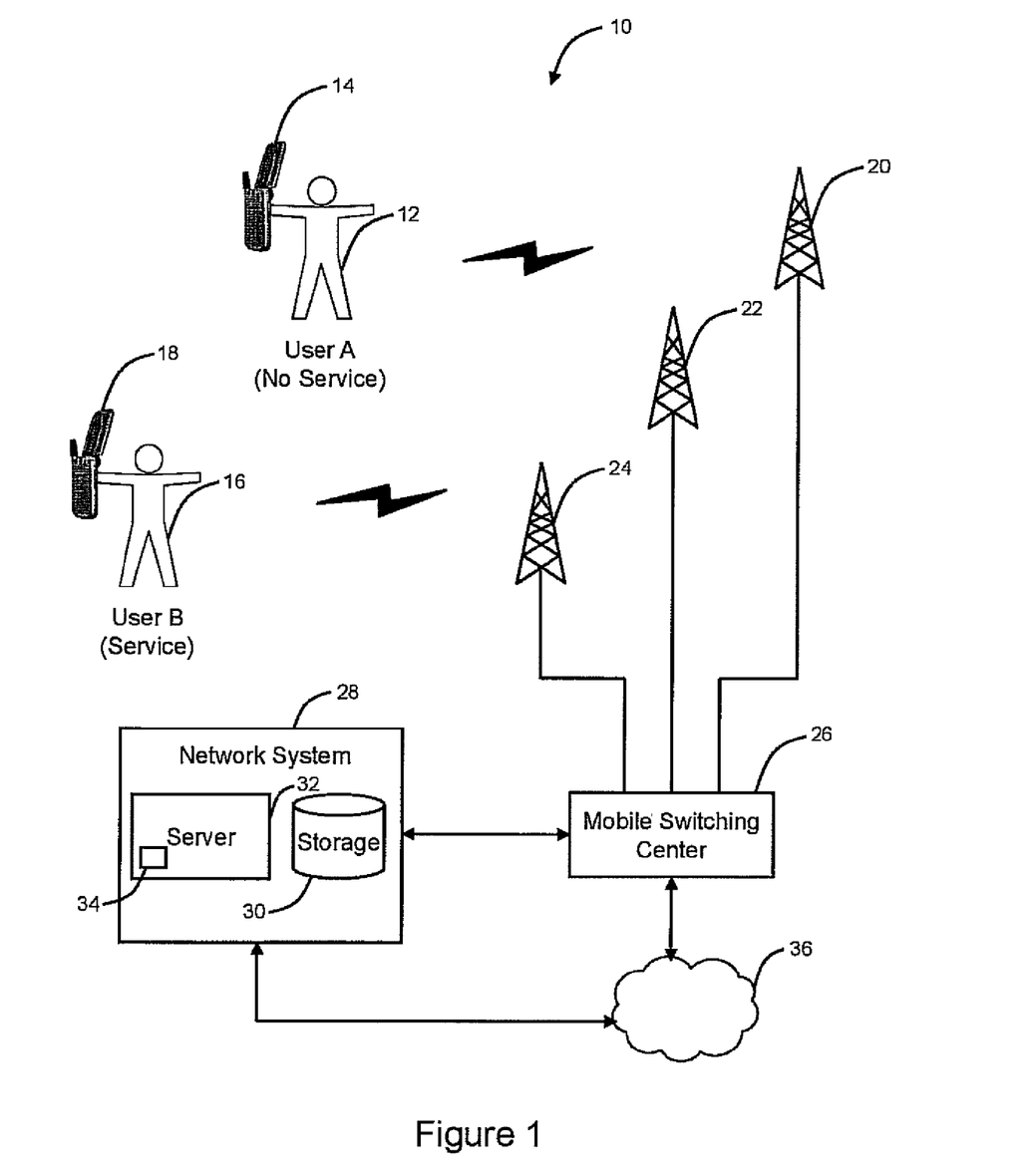
FIG. 1 shows an illustrative block diagram of a system that allows a user to have temporary access to another user's service.

Referring to FIG. 1 there is shown an illustrative block diagram of a system that allows a user to have temporary access to another user's service. In the illustrative system 10, a first user 12 (User A) has a right to use a wireless handset 14, but does not have access to a service, e.g. international long distance. The second user 16 does have access to the illustrative international long distance service with illustrative wireless handset 18.

The wireless handsets 14 and 18 are configured to communicate with one or more base stations 20, 22 and 24. The illustrative base stations 20, 22, and 24 may communicate with the wireless handsets 14 and 18 using a variety of different communication standards including, but not limited to, various forms of code division multiple access (CDMA) and time division multiple access (TDMA) wireless interfaces and other such communication standards. Alternatively, the base stations may also be referred to as access points, or any other such two-way radio installation in a fixed location that is used to communicate with a wireless handset.

The illustrative wireless handsets 14 and 18 may be a mobile handset, mobile phone, mobile station, wireless phone, portable cell phone, cellular phone, portable phone, a personal digital assistant (PDA), or any type of mobile terminal which is regularly carried by a user and has all the elements necessary for operation in a wireless communication system. The wireless communications systems include, by way of example and not of limitation, CDMA, GSM or UMTS or any other wireless communication system such as wireless local area network (WLAN) or WiMAX. It shall be appreciated by those of ordinary skill in the art that the term wireless handset, mobile station, mobile handset, wireless phone, and mobile phone are interchangeable.

The illustrative wireless handset is configured to communicate wirelessly with base stations 20, 22 and 24, which are operatively coupled to mobile switching center 26. The mobile switching center 26 is configured to communicate with network system 28 having a storage component 30 and a service management server 32.

The management server 32 manages a service, e.g. international long distance service. The illustrative management server 32 may be hosted by the wireless network service provider. The illustrative management server 32 also comprises a management module 34 that manages the software and firmware updates related to billing, granting temporary access to the a particular service, notification, authentication, validation, testing, scheduling, status tracking, removal, termination of services, and other such operations. The mobile switching center 26 is also configured to communicate with a Wide Area Network (WAN) 36 represented by the network cloud. By way of example and not of limitation, the WAN 36 is the Internet.

Figure 2:
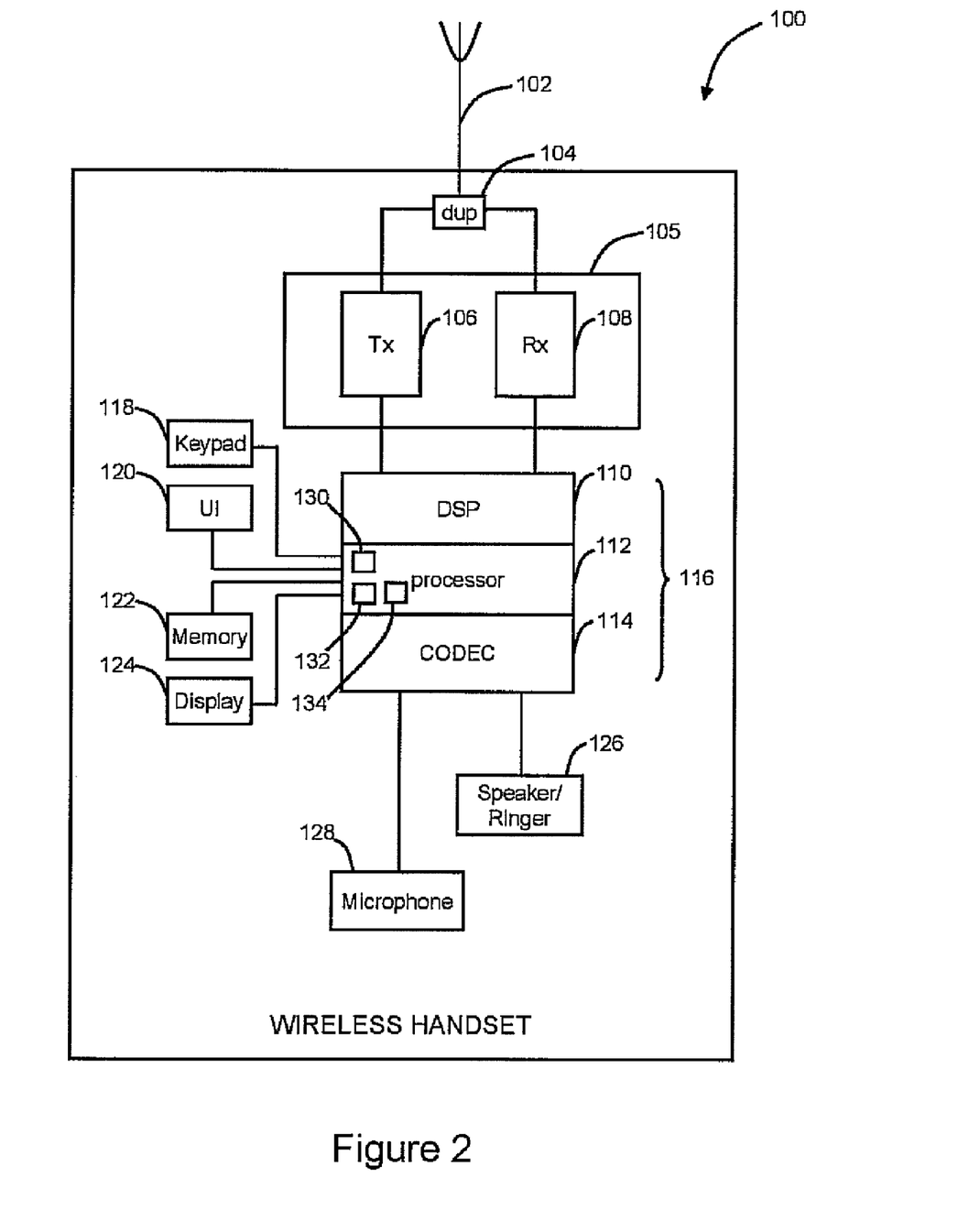
FIG. 2 shows an illustrative wireless handset that enables a user having access to a service to grant temporary access to the service.

Referring to FIG. 2 there is shown a wireless handset that enables a user having access to a service to grant temporary access to another user. The illustrative wireless handset 100 is configured to operate within the illustrative system 10 shown in FIG. 1 and referred to as wireless handset 14 and 18.

The illustrative wireless handset 100 comprises a first antenna element 102 that is operatively coupled to a duplexer 104, which is operatively coupled to transceiver 105 that includes transmitter 106 and receiver 108. An illustrative control module 116 comprises a digital signal processor (DSP) 110, a processor 112, and a CODEC 114 that are communicatively coupled to the transmitter 106 and receiver 108. The DSP 110 may be configured to perform a variety of operations such as controlling the antenna 102, transmitter 106, and receiver 108 operations. The processor 112 is operatively coupled to a keypad 118, a user interface (UI) 120, a memory 122, and a display 124. The memory 122 includes volatile memory, e.g. RAM, and nonvolatile memory, e.g. ROM.

Non-volatile memory is associated with non-volatile data structures. A non-volatile memory is computer memory that can retain the stored information even when not powered. Examples of non-volatile memory include read-only memory, flash memory, or any other such memory that retains its stored information through a power cycle. There are two kinds of non-volatile data structures, namely "variant" non-volatile data structures and "invariant" non-volatile data structures. These non-volatile data structures exist in the embedded file system (EFS) so they are preserved through a power cycle. Non-volatile data structures are associated with non-volatile items, which are components of a non-volatile file. By way of example and not of limitation, non-volatile items include a Mobile Directory Number (MDN), Home System Identification Code (Home-SID), Mode Preference, Roam Preference, Point-to-Point Protocol (PPP) User ID, PPP Password, Mobile IP, and other such non-volatile items that are associated with the non-volatile memory.

The processor 112 is also operatively coupled to the CODEC module 114 that performs the encoding and decoding operations and is communicative coupled to a speaker or ringer 126, and a microphone 128.

The illustrative wireless handset 100 may be built as a lightweight and small device adapted to be portable and may be conveniently carried around by a user. The wireless handset 100 is further adapted for caller operation and allows the user to interact with user interface (UI) 120 by manually inputting data with the keypad 118 that may be a normal key pad, such as key pad for a cell phone or a PDA, and may additionally include specific input keys, such as a scrolling means or the like, to input particular information or to perform particular selection functions. Input data or requests may be taken from voice information that are received from microphone 124 or a combination of voice information and DTMF signals. Additionally, input data may be received from a touch screen display. The memory module 120 may be used for storing input data or storing programming information that is pre-loaded on the mobile handset 100, or that has been downloaded to the mobile handset 100.

In addition to the non-volatile memory and volatile memory 122, the processor 112 comprises a plurality of illustrative software modules or firmware, namely, a UI module 130, a WMS module 132, and a call manager module 134 that supports the services described herein. For example, the call manager module 134 performs the call origination and termination services. Changes may be made to specific software modules or firmware to support the functions described herein.

The User Interface (UI) module 130 includes a menu item for the user interface having a first button that enables the illustrative international long distance or ISD service and another button that disables the ISD service. Additionally, the UI module 130 may include service programming as a non-volatile item when the illustrative international long distance or ISD service is enabled and disabled. The UI module 130 enables the second wireless handset (User B) to request the first wireless handset have temporary access to the international long distance or ISD service. The UI module 130 is configured to receive authentication information from the first wireless handset (User A) and can communicate the authentication information to the wireless network service provider.

The Wireless Messaging Service (WMS) module 132 is another illustrative software module running on top of processor 112. The WMS module 132 handles the sending of messages to the users after the requested service is enabled or disabled. The WMS module 132 also receives the message and forwards the same to the UI module 130 where the message is displayed on display 124 to the user having the service.

For the illustrative user not having access to the service, when the "enable ISD service" is selected, the WMS module 132 internally generates a specially formatted SMS to send to the User B (has service) to allow User A that is sending the message to use the requested service. A specially formatted message may be defined by wireless network service provider. If the "disable ISD service" is selected, the WMS module 132 internally generates a specially formatted SMS to send to User B (has service) to disable the service for User A.

Figure 3A:
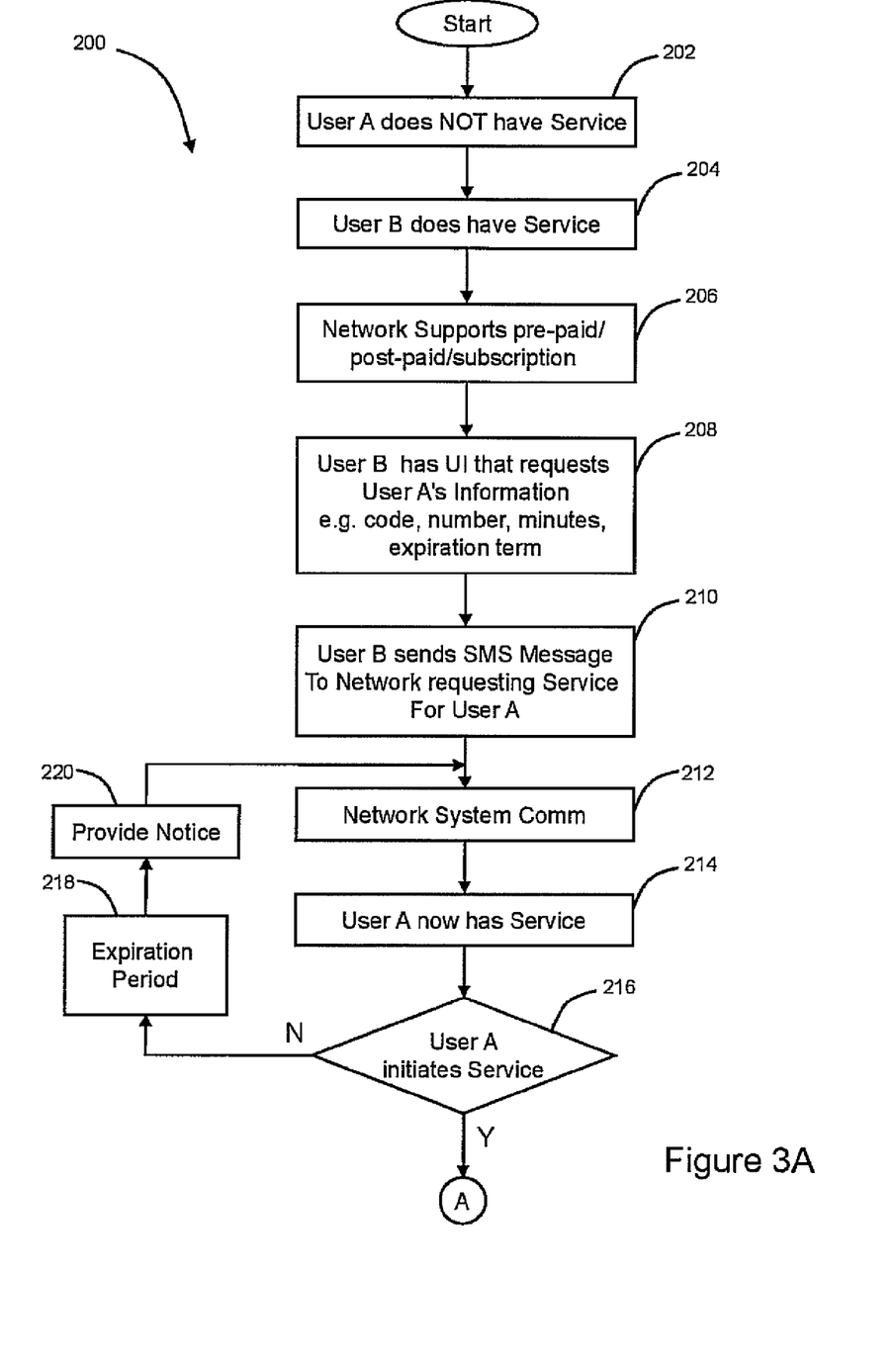
FIGS. 3A and 3B show an illustrative flowchart of a method for a user to have temporary access to a service that is accessible to a second user.
Figure 3B:
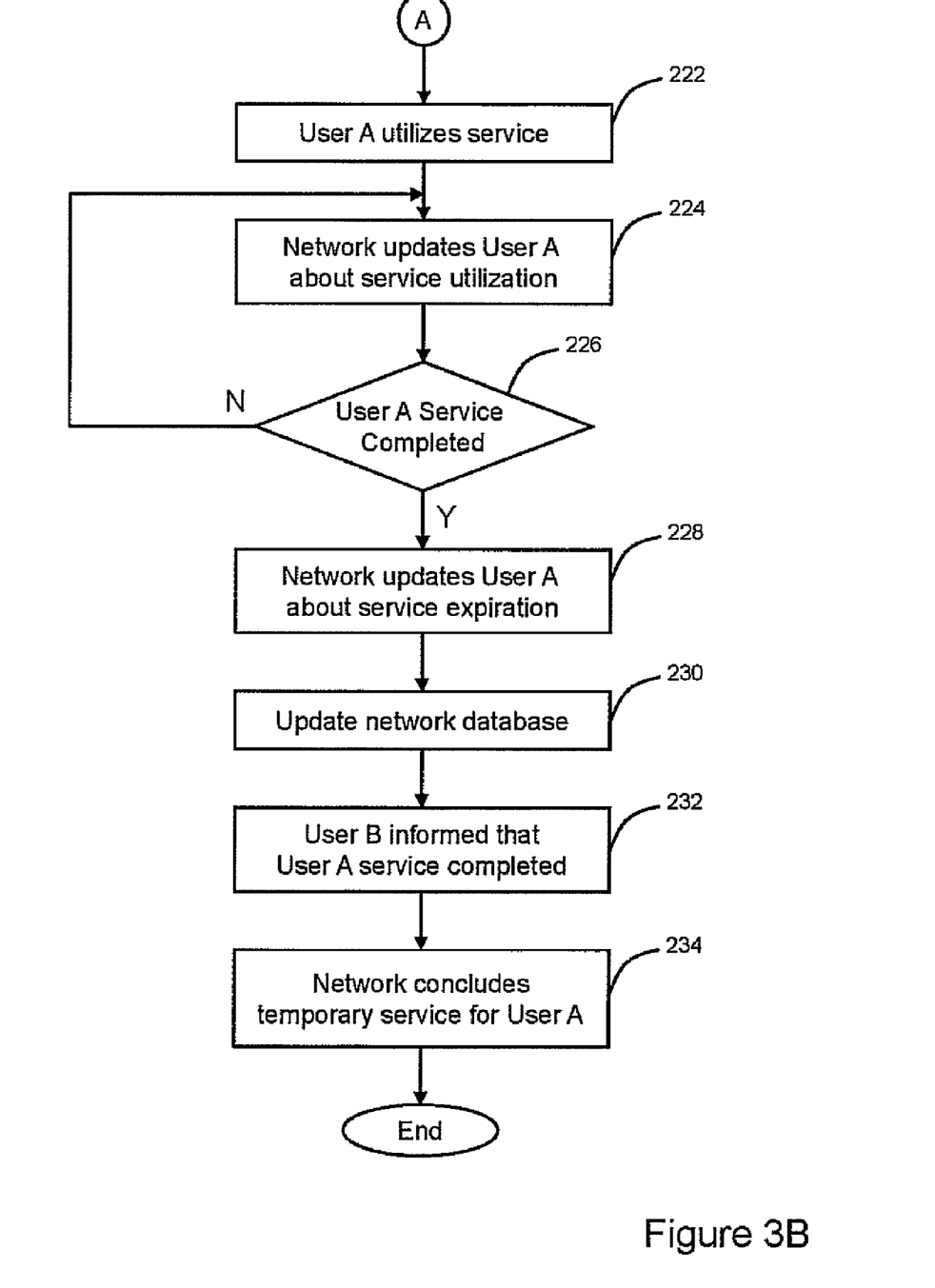

Referring to FIGS. 3A and 3B there is shown an illustrative flowchart of a method for a first user to have temporary access to a first service that is accessible to a second user. At block 202, the illustrative first user (User A) does not have access to a desired service. As indicated above, there are a variety of services that can be supported the wireless handset, systems and methods described herein. In the illustrative embodiment User A does not have access to international long distance service. However, as indicated by block 204, User B does have access to the illustrative service, namely, the international long distance service. In operation, the User A (no service) requests that User B allow User A to make an international long distance phone call.

In the illustrative embodiment, User A may then proceed to contact User B and request that User B enable User A to temporarily access the international long distance service.

The illustrative wireless network service provider supports various billing means as indicated by block 206. The billing service includes pre-paid service, post-paid service, subscription service, transaction based service, or other such billing means. Generally, User B is charged for the service on behalf of User A. However, there may be instances where User B may be acting as a cosigner, thereby agreeing to be responsible for the payment of the service if User A defaults on payment.

After communicating with User A, User B (has service) then proceeds to interact with the UI 120 at block 208. In a first illustrative embodiment, User B responds to User A's (no service) request with an authentication code using a messaging means such as Short Message Service (SMS). Similar protocols may also be used such Enhanced Messaging Service (EMS), Multimedia Messaging Service (MMS), Short message peer-to-peer protocol, WAP push, and other such protocols. The authentication code enables User B to have temporary access to the service by requiring the authentication code be used prior to initiating the international long distance call. In this first illustrative embodiment, the wireless network service provider validates the authentication code before establishing the call. In operation, the authentication code is first submitted and then User A (temporary service) proceeds to dial the international long-distance phone number. This first illustrative embodiment supports pre-paid billing and post-paid billing.

In a second illustrative UI embodiment, the UI 120 presented on the wireless handset corresponding to User B (has service) requests the telephone number associated with wireless handset 14 corresponding to User A. Additionally, information such as number of minutes to grant and an expiration term may also be requested by User B. This second illustrative embodiment supports pre-paid billing for the illustrative international long distance service.

At block 210, the illustrative embodiment includes having User B send an SMS message to the wireless network requesting that User A be temporarily granted access to the service. More generally, User B communicates information about User A to the wireless network service provider so the wireless network service provider can enable the facility for User A.

At block 212, the network system communicates with User B and User A and enables User A to have limited or temporary access to the particular User B service. For example, the network database corresponding to service management server 32 (see FIG. 1) may be updated in block 212 with information about User A that allows User A to have access to the User B's service.

The illustrative network database includes a billing module that can manage the pre-paid, post-paid, subscription, or any other such billing service offering. In the illustrative embodiment, User B (has service) is charged at block 212 for granting temporary access to the service. Furthermore, User B may be charged an additional service fee for enabling User A to have temporary access to the service. Thus, if User A uses the minutes associated with the temporary service, User B is charged at User B's service rate plus a service fee. In another embodiment, User A is charged and User B acts as a cosigner.

The network system also includes a means for obtaining or generating the authentication code described above. In one embodiment, User B and the operator have access to the same algorithm that generates the authentication code. In another embodiment, the service management server 32 (see FIG. 1) generates the authentication code and then communicates the authentication code to User A or User B. If only User B receives the authentication code, then User B forwards the authentication code to User A.

The process of generating an authentication code may be similar to generating a cryptographic key using a cryptographic algorithm. Thus, if the received authentication code or cryptographic key is lost by User A, then User A has to request another authentication code or cryptographic key from either User B or the wireless network service provider.

The method then proceeds to block 214, where User A now has access to the service. User A may receive notification about the temporary or limited access to the service by User B, the wireless network service provider, or the combination thereof In one illustrative embodiment, User B sends User A notification regarding the temporary and/or limited access provided for the service.

At decision diamond 216, the determination is made whether User A has started using the service. If the User A has not used the illustrative minutes, a determination should be made whether the minutes are subject to an expiration period as described in block 218. By way of example and not of limitation, if User A does not use the minutes within the expiration term, they go away and User B is not charged or is only charged the service fee. At block 220, User A is then provided notice of the expiration period. For example, to make things clear to User A, the network could send a message saying "You have temporary access to 20 minutes of long distance service available courtesy of User B. The minutes must be used by within 30 days from this message date." After the period is up, the network could send another message saying, "The remaining 10 minutes provided to you by User B have now expired and can no longer be used."

If User A has initiated service usage at decision diamond 216, the method proceeds to block 222 where User A utilizes the temporary or limited service. In certain instances, User A may only be permitted to use the authentication code for a single event and the authentication code expires after the single event. In other instances, User B may provide temporary access to the service to a plurality of users by simply sharing the authentication code.

With respect to the single event embodiment, User B (has service) has to generate a unique key or authentication code every time there is a request to temporarily access the service. Thus, when the temporary service usage is restricted to a single event, both User B and the wireless network service provider must agree to User A's single use.

In operation, the wireless device, systems and methods described herein also support User A and User B being able to make calls and use the same service at the same time, e.g. three-way calling. Thus, when User A is calling, User B can also make calls. Two illustrative embodiments that support both users making calls at the same time are described in this paragraph. In the illustrative first embodiment where both users have access to the same service, the call set up procedure for both users remains the same and both User B (has service) and User A (has temporary service) can initiate and/or receive calls; and when User A utilizes this service, the service is billed to User B. In the illustrative second embodiment where both users have access to the same service, a supplementary service approach can be used by both users for an ISD call. In the supplementary service embodiment, User A (has temporary service) has initiated an ISD call where voice traffic is established between User A and another person; and when User B initiates a call at the same time, the wireless network service provider may "hold" the first call between User A and the other person and initiate a second User B call that establishes voice communications between User B and yet another person.

At block 224, the network system updates User A about the remaining service usage or service utilization. For example, the network may send an SMS message to User A stating that out of the 30 minutes of temporary usage, 20 minutes have been used, and 10 minutes remain available for service usage for another one week period. The network may also send an SMS message to the User B (has service) mentioning the temporary service utilized by the User A and the remaining available service for usage; thereby assisting User B in understanding User A's usage and corresponding billing.

At decision diamond 226, the determination is made whether User A has completed use of the service. If yes, the method proceeds to block 228 where the wireless network service provider updates User A about the expiration of the service. At block 230, the network system is updated to reflect the expiration of the access to the service, the billing cycle is completed, and notifications are initiated. For example, at block 232 User B is informed that User A has completed using the temporary service. At block 234, the wireless network service provider concludes providing the temporary service to User A.

Figure 4:
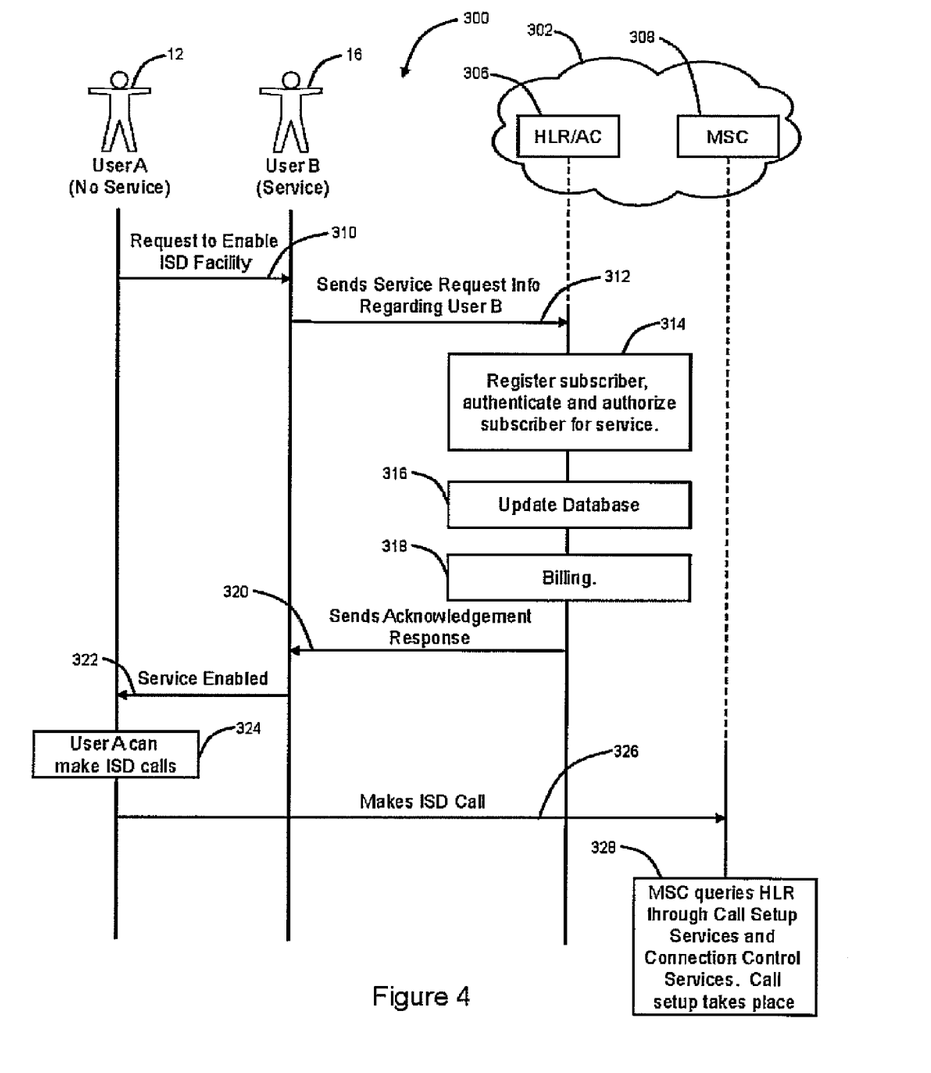
FIG. 4 shows a sequence diagram of the operations and tasks performed when the second user grants temporary access to the first user for the service.

The sequence diagrams presented below in FIG. 4 and FIG. 5 describe enabling and disabling the service. Referring to FIG. 4 there is shown a sequence diagram 300 of the operations and tasks performed when User A (no service) is granted temporary access to User B's service. A wireless network 302 managed by a wireless network service provider is configured to support the illustrative international long distance service. For the illustrative embodiment, both User A and User B are registered to communicate with the wireless network.

The first wireless handset corresponding to the first wireless user 12 (User A) is configured to communicate with a wireless network 302 managed by a wireless network service provider. Although the first wireless user 12 can communicate with the wireless network, the first wireless user 12 and his corresponding handset 14 (see FIG. 1) do not have access to the international long distance service. However, the second wireless user 14 (User B) has a corresponding second wireless handset that is enabled to access the international long distance service or ISD service supported by the wireless network 302.

The illustrative wireless network 302 includes a Home Location Register (HLR) and an Authentication Center (AC) 306. It shall be appreciated that the HLR stores information about the location of the user and the AC is responsible for authenticating the user. In operation, the HLR verifies that the indicated wireless handset is authorized for the service. The HLR may then proceed to communicate with the AC, which may then proceed to generate random and/or cryptographic keys corresponding to granting the first wireless user 12 temporary access to User B's service. The HLR/AC 306 may also communicate with the service management server 32 (see FIG. 1) that manages the operations that grant User A temporary access to User B's service. The mobile switching center 308 is also part of the wireless network 302 and communicates with various networks such as switch telephony networks or packet based networks. The purpose of the MSC 308 is to establish connection and route traffic originated from or terminating on the wireless handsets.

In the sequence diagram of FIG. 4, User A requests that User B enable the international long distance or ISD service as indicated by arrow 310. In the illustrative embodiment User A (no service) generates authentication information that is communicated to the User B (has service). By way of example and not of limitation, User A may first call or SMS User B and request temporary access to long distance service; and User B may then respond by requiring User A to communicate a request to enable the ISD facility that User B will forward as described below.

At arrow 312, the UI module 130 on the User B's handset generates a service request that requests the first wireless handset have temporary access to the first service. In operation, the UI module 130 on User B's handset is configured to receive the authentication information from User A and communicate this authentication information to the wireless network 302. By way of example and not of limitation, the service request generated by the user interface is communicated as a SMS message.

At block 314, the wireless network service provider proceeds to register User A, authenticate User A, and authorize User A to have temporary access to the service. Subsequently, the service management server 32 and storage component is updated to provide User A with temporary or limited access to the illustrative long distance service at block 316. At block 318, the next action may include charging or billing User B for the temporary service provided to User A.

At arrow 320 a first service acknowledgement is communicated via the wireless network to the second wireless handset (User B) that acknowledges the first wireless handset (User A) has temporary access to the first service. In the illustrative embodiment, the first service acknowledgement is communicated using SMS.

In the illustrative embodiment, at arrow 322, a second service acknowledgement may then be generated by User B and communicated to the first wireless handset, which confirms the first wireless handset (User A) has temporary access to the first service. Alternatively, the second service acknowledgement may be generated by the wireless network service provider and communicated directly to User A confirming that User A has been granted temporary access to the first service by User B.

At block 324, User A has temporary access to the service and can make the illustrative international long distance calls as indicated by the arrow 326. At block 324, the illustrative MSC 308 queries the HLR through call setup services and connection control services so that call setup can take place for the international long distance call.

Figure 5:
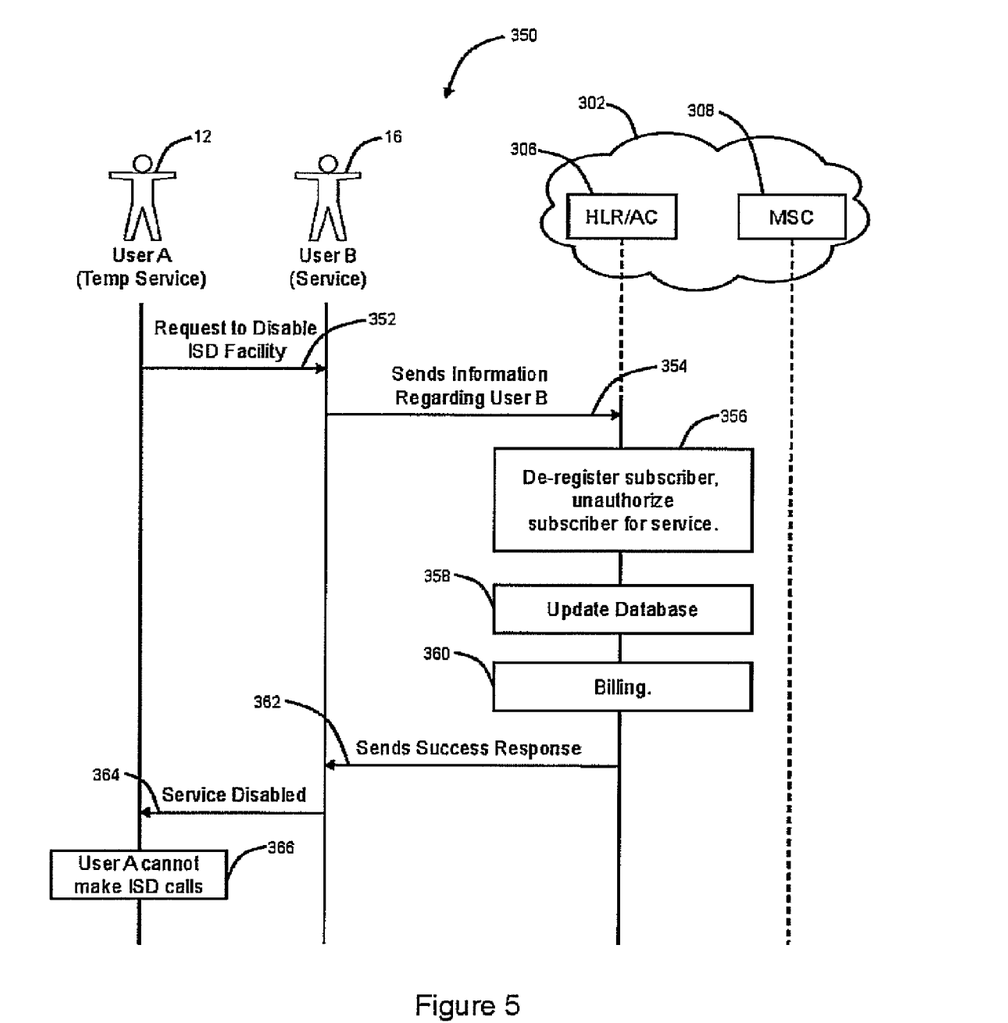
FIG. 5 shows a sequence diagram of the operations and tasks performed when disabling the temporary access to the service.

Referring to FIG. 5 there is shown a sequence diagram of the operations and tasks performed when the temporary access for the service is disabled. The terminating or disabling of the service may also be described as "disabling the facility." In general, the process of disabling the service includes communicating a disable service acknowledgement that indicates the temporary access granted to the first wireless handset has expired as described below.

FIG. 5 shows the sequence initiated at arrow 352 where User A, having temporary access to the service(s), requests disabling the temporary service(s). Alternatively, User B may terminate the facility that was provided to User A without User A's approval. The sequence then proceeds with User B communicating information specific to User A that enables the wireless network service provider to disable the User A services as indicated by arrow 354.

At block 356, the wireless network service provider deregisters User A, who is assumed to be a subscriber, and terminates User A's authorization to use the temporary service. Other illustrative actions may also be taken such as updating the network database and removing User A's information as reflected by block 358. Another illustrative action may include deleting the data corresponding to User B, User A, and billing User B when User A has utilized the facility as indicated by block 360.

After completing the entire process successfully, the sequence then proceeds to arrow 362 where the wireless network service provider sends response to User B notifying User B that the temporary service has been terminated or disabled. The sequence then proceeds to arrow 364 where User B proceeds to inform User A that the facility provided has been disabled.

It is to be understood that the detailed description of illustrative embodiments are provided for illustrative purposes. The scope of the claims is not limited to these specific embodiments or examples. Therefore, various elements, details, execution of any methods, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for a first wireless user to temporarily access a service accessible to a second wireless user, the system comprising:
   a wireless network service provider configured to provide a long distance service using a wireless network;
   a subscription long distance service supported by the wireless network service provider;
   a first wireless handset corresponding to the first wireless user that is configured to communicate with the wireless network that provides the long distance service, wherein the first wireless handset can communicate with wireless network, but does not have a subscription to the long distance service supported by the wireless network;
   a second wireless handset corresponding to the second wireless user that is configured to communicate with the wireless network, wherein the second wireless handset can access the subscription long distance service supported by the wireless network service provider;
   a user interface corresponding to the second wireless handset that enables the second user to request the first wireless handset have temporary access to the long distance-service and billing the second user for the long distance service, wherein the user interface is configured to receive authentication information from the first wireless device for accessing the long distance service associated with the first wireless handset, the authentication information is communicated by the second wireless handset to the wireless network service provider;
   a service request communicated from the second wireless handset to the wireless network service provider that requests the first wireless handset have temporary access to the long distance service;
   a first service acknowledgement communicated from the wireless network to the second wireless handset that acknowledges the first wireless handset has temporary access to the long distance service;

a remaining time period for the temporary access granted to the first wireless handset for the subscription long distance service;

a disable service acknowledgement communicated from the wireless network to the first wireless handset that indicates the remaining time period for the temporary access granted to the first wireless handset for the long distance service; and a means for billing the second wireless user for the temporary access granted to first wireless handset.

2. The system of claim 1 further comprising a second service acknowledgement communicated to the first wireless handset that confirms the first wireless handset has temporary access to the first service.

3. The system of claim 2 wherein the user interface further comprises an SMS message that is communicated to the wireless network service provider, wherein the SMS message comprises the service request.

4. The system of claim 2 wherein the first service is an international long distance service.

5. The system of claim 2 wherein the first service transfers a plurality of wireless handset minutes to the first wireless handset.

6. A method for a first wireless user to have temporary access to a service that is accessible to a second wireless user, the method comprising:

using a wireless network managed by a wireless network service provider that is configured to support a subscription long distance service;

enabling a first wireless handset corresponding to the first wireless user to communicate with the wireless network without initially providing the first wireless handset with a subscription to the long distance service;

enabling a second wireless handset corresponding to the second wireless user to access the subscription long distance service supported by the wireless network, wherein the second wireless handset is configured to communicate with the wireless network;

requesting from a user interface corresponding to the second wireless handset that the first wireless handset have temporary access to the long distance service and billing the second user for the long distance service, wherein the user interface is configured to indicate that authentication information from the first wireless handset has been received, the authentication information configured to be communicated by the second wireless handset to the wireless network service provider;

communicating a service request from the second wireless handset to the wireless network service provider that requests the first wireless handset have temporary access to the long distance service;

communicating a first service acknowledgement via the wireless network to the second wireless handset that acknowledges the first wireless handset has temporary access to the long distance service;

granting temporary access for a remaining time period to the first wireless handset for the subscription long distance service;

communicating a disable service acknowledgement from the wireless network to the first wireless handset that indicates the remaining time period for the temporary access granted to the first wireless handset for the long distance service; and billing the second wireless user for the temporary access to the first service granted to the first wireless handset.

7. The method of claim 6 further comprising communicating a second service acknowledgement to the first wireless handset that confirms the first wireless handset has temporary access to the first service.

8. The method of claim 7 wherein the user interface further comprises an SMS message that is communicated to the wireless network service provider, wherein the SMS message comprises the service request.

9. The method of claim 7 wherein the first service is an international long distance service.

10. The method of claim 7 wherein the first service transfers a plurality of wireless handset minutes to the first wireless handset.

11. A first wireless handset having access to, the first wireless handset comprising:

a first wireless handset transceiver configured to communicate with a wireless network managed by a wireless network service provider that supports a subscription long distance service, wherein the first wireless handset has access to the long distance service;

the wireless network is configured to communicate with the first wireless handset and a separate second wireless handset that initially does not have access to the subscription long distance service;

a user interface that enables the separate second wireless handset to have temporary access to the long distance-service associated with the first wireless handset and billing the first wireless handset for the temporary access to the long distance service, wherein the first wireless handset user interface is configured to indicate receiving authentication information from the separate second wireless handset, the authentication information configured to be communicated by the first wireless handset to the wireless network service provider;

a service request communicated from the first wireless handset to the wireless network service provider that requests the separate second wireless handset have temporary access to the long distance service; and a first service acknowledgement received by the first wireless handset that acknowledges the separate second wireless handset has temporary access to the long distance service; and a remaining time period for the temporary access granted to the first wireless handset for the subscription long distance service;

a disable service acknowledgement communicated from the wireless network to the second wireless handset that indicates the remaining time period for the temporary access granted to the separate second wireless handset for the long distance service.

12. The wireless handset of claim 11 wherein the user interface further comprises an SMS message that is communicated to the wireless network service provider, wherein the SMS message comprises the service request.

13. The wireless handset of claim 12 wherein the first service is an international long distance service.

14. The wireless handset of claim 12 wherein the first service transfers a plurality of wireless handset minutes to the separate wireless handset.

* * * * *